United States Patent Office 3,203,499
Patented Aug. 31, 1965

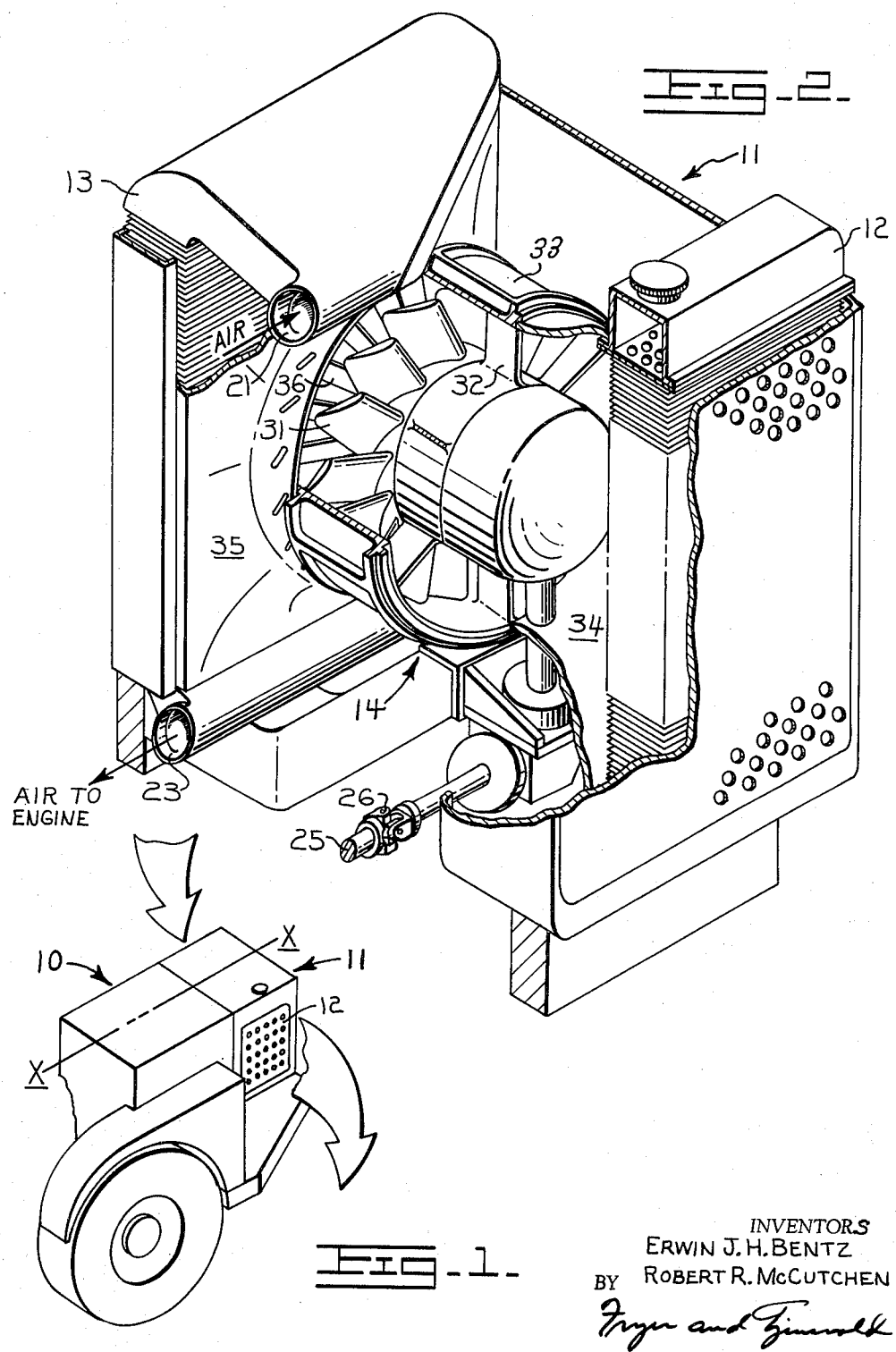

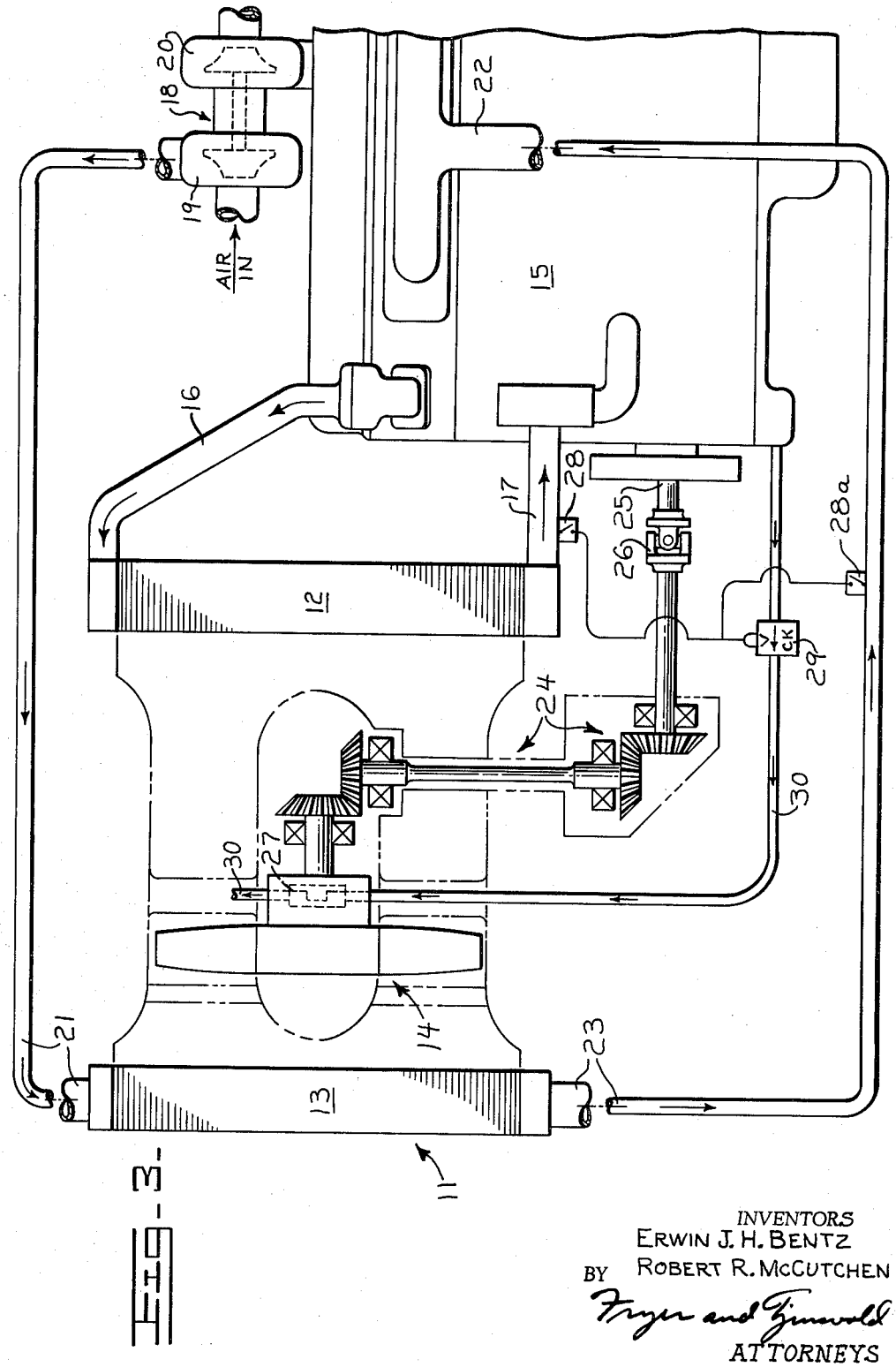

3,203,499
COOLING ARRANGEMENT FOR SUPER-
CHARGED ENGINES
Erwin J. H. Bentz, Washington, and Robert R. Mc-
Cutchen, East Peoria, Ill., assignors to Caterpillar Trac-
tor Co., Peoria, Ill., a corporation of California
Filed June 8, 1962, Ser. No. 201,187
7 Claims. (Cl. 180—68)

This invention relates to a cooling arrangement for supercharged engines and more particularly relates to an intercooler and radiator arrangement for an internal combustion engine.

The demand for increased engine output has provided the need for efficient cooling arrangements. This problem is particularly apparent in connection with supercharged engines wherein it is desired to substantially cool the air which is discharged from the compressor into the engine. This cooling provides the engine with as much air as possible in order to provide for cooler combustion and thus reduce combustion chamber carbon deposits. It is further desirable to maintain the engine at a relatively cool tempertaure by means of a conventional radiator arrangement. One of the factors which makes it impossible to solve this problem by merely increasing the intercooler and radiator sizes is the lack of sufficient space in the engine compartment of the vehicle.

A typical attempted solution to this problem has comprised the placing of an engine intercooler in front of the standard radiator. This arrangement has not proved satisfactory primarily due to the limited amount of space in which the intercooler and radiator may be arranged on the front of the vehicle. Furthermore, with such an arrangement a shroud must be provided to prevent damage to the cooling cores of the intercooler. Such a shroud adds penalizing weight to the system as well as reducing the amount of air flow therethrough.

The novel cooling arrangement of this invention provides for an effective cooling of engine consumed air and engine coolant while at the same time avoiding damage thereto. To effect these desired results, novel aspects of this invention lie in the placing of an intercooler and radiator in substantially parallel relationship on first and second sides of a vehicle and arranging a fan therebetween in order to pump ambient air therethrough.

An object of this invention is to provide an efficient cooling arrangement for an internal combustion engine.

Another object of this invention is to provide an engine intercooler and radiator arrangement for efficiently cooling engine consumed air and engine coolant, respectively.

A still further object of this invention is to provide a cooling arrangement for a vehicle having an internal combustion engine which arrangement is not prone to damage.

A still further object of this invention is to provide a pumping arrangement which does not use engine power when such power is not needed therefor.

Other and more specific objects of this invention will become apparent from the following description taken in connection with the following drawings wherein:

FIG. 1 discloses a cooling arrangement comprising novel concepts of this invention in combination with a vehicle having an internal combustion engine;

FIG. 2 is a partially sectioned, isometric view disclosing the cooling arrangement of FIG. 1, per se;

FIG. 3 is a schematic view, with parts suitably orientated for discussion purposes, disclosing the cooling arrangement of FIG. 2 as it would appear in combination with a supercharged, internal combustion engine.

FIG. 1 discloses a vehicle 10 arranged for movements in the direction of its longitudinal axis X—X. A cooling arrangement 11, arranged on the front end of the vehicle, provides cooling means in the form of a radiator 12 and intercooler 13 (FIG. 2) mounted in substantially parallel relationship on the sides thereof. Thus, as indicated by the arrows shown in FIG. 1, ambient air may be drawn through the cores of the intercooler and out through those of the radiator by means of a fan arrangement which is generally shown at 14 in FIG. 2.

Referring now to FIG. 3, the radiator 12 communicates with coolant receiving chambers (not shown) of an internal combustion engine 15 to circulate the fluid coolant therethrough by means of conduits 16 and 17. The engine is operatively connected to a conventional supercharger 18 which comprises a compressor 19 and turbine 20. A second fluid in the form of compressed air is discharged from the compressor and transmitted to the intercooler by means of a conduit 21 and thereafter discharged into an intake manifold 22 of the engine by means of conduit 23. A standard transmission assembly 24 is arranged to receive power from the engine crankshaft 25 through universal joint 26 and transmit such power to the fan assembly 14 (FIG. 2) by means of normally disengaged fluid deactuated slip clutch 27.

Standard temperature sensitive switches 28 and 28a may be operatively secured to conduits 17 and 23, respectively, in order to close a conventional, normally opened and spring biased solenoid actuated valve 29 in response to the temperature level sensed at one or both of the switches. The fluid flow in a conduit 30 which normally functions to disengage the plates of clutch 27 may thus be stopped to totally engage such plates. The conduit 30 may be arranged to receive its fluid from a suitable source such as the engine lubricating system. This system may be designed to reduce the fluid pressure in conduit 30 in proportion to the temperature levels sensed by the solenoid valve. Thus, the degree to which the clutch plates of slip clutch 27 are permitted to engage each other may be made directly dependent on such temperature levels. However, if so desired, the system may be designed to actuate the clutch in the more simplified on-off manner. In accordance with this arrangement and during selective phases of engine operation, when the temperatures of the fluid flowing through conduit 17 and/ or 23 reach a predetermined maximum, the fan assembly may be engaged to receive only the power necessary from drive shaft 25 which is needed to maintain the fluid temperatures below said predetermined maximum.

As disclosed in FIG. 2, the fan assembly 14 essentially comprises a fan 31 which is mounted for rotation therein by means of a spider having support members 32 which secure the assembly to a housing 33. The housing 33 may in turn be mounted on the frame of the vehicle. Shrouds 34 and 35 are also mounted on the vehicle frame and arranged adjacent to the radiator and intercooler, respectively, in order to form a closed air passage. Stationary air vanes 36 may be provided between the intercooler and fan in order to guide the air flow. It should be understood that the fan assembly may be rearranged to pump air from the radiator to the intercooler, if so desired.

This arrangement, and in particular the parallel arrangement of the intercooler and radiator relative to the axis X—X of the vehicle, provides that these cooling means may be formed with relatively thick cores as compared to those included in conventional arrangements. Furthermore, the amount of debris which can enter the intercooler and radiator is substantially reduced by this arrangement.

We claim:

1. A cooling arrangement mounted on a front end of a vehicle having first and second side portions arranged in planes which are in substantially parallel relationship with a longitudinal axis of said vehicle, said cooling arrangement comprising an intercooler for receiving engine consumed air therein and having cores arranged on the first side of said vehicle for receiving and guiding ambient air therethrough and a radiator arranged in juxtaposed relationship to said intercooler for receiving an engine coolant therein and having cores arranged on the second side of said vehicle for directly receiving said ambient air from said intercooler transversely of said axis.

2. The invention of claim 1 further comprising pump means operatively associated with and arranged between said intercooler and said radiator for selectively pumping air from said first cooling means to said second cooling means.

3. The invention of claim 2 further comprising drive means for selectively driving said pump means and means for sensing the temperature of said engine consumed air and engine coolant and operatively associated with said drive means for regulating the speed of said pump means in accordance with one or both of said sensed temperatures.

4. A cooling arrangement mounted on the front end of a vehicle having first and second substantially parallel sides and a supercharged internal combustion engine, said vehicle arranged for movement along a longitudinal axis thereof, said cooling arrangement comprising an intercooler arranged on the first side of said vehicle in a plane which is in substantially parallel relationship with respect to said axis and communicating with a conduit which further communicates with an intake manifold of said engine for supplying cooled air thereto, a radiator arranged in juxtaposed relationship to said intercooler and further arranged on the second side of said vehicle in a plane which is in substantially parallel relationship with respect to said intercooler and communicating with a conduit which further communicates with a cooling chamber of said engine for supplying an engine coolant thereto, and a fan mounted for rotation and arranged between said intercooler and said radiator for pumping ambient air therebetween.

5. The invention of claim 4 further comprising means operatively associated with said conduits and operatively connected to said fan responsive to a predetermined temperature level sensed in either or both of said conduits for driving said fan.

6. A cooling arrangement mounted on a land vehicle having an engine, said vehicle arranged for movement in the direction of a longitudinal axis thereof, said cooling arrangement comprising an air cooler for receiving engine consumed air and having cores arranged on one side of said longitudinal axis for guiding ambient air therethrough, a second fluid cooling means arranged in laterally spaced relationship to said air cooler and having means for receiving ambient air therethrough, said second cooling means being positioned on the opposite side of said longitudinal axis and fan means mounted between said cooling means for rotation on an axis transverse to said longitudinal axis for urging ambient air through said air cooler and said second fluid cooling means.

7. The invention of claim 6 further comprising means substantially forming a closed air passage between said air cooler and said second fluid cooling means.

References Cited by the Examiner

UNITED STATES PATENTS

| 2,253,438 | 8/41 | Lutz | 180—1.5 |
| 2,274,442 | 2/42 | Woods | 180—68 X |
| 2,388,247 | 11/45 | Berkow | 244—57 X |
| 2,637,308 | 5/53 | Dodge | 123—41.12 X |
| 2,661,148 | 12/53 | Englander | 123—41.12 X |

FOREIGN PATENTS

| 228,100 | 3/26 | Great Britain. |

PHILIP ARNOLD, *Primary Examiner.*

A. HARY LEVY, *Examiner.*